Figure 1:
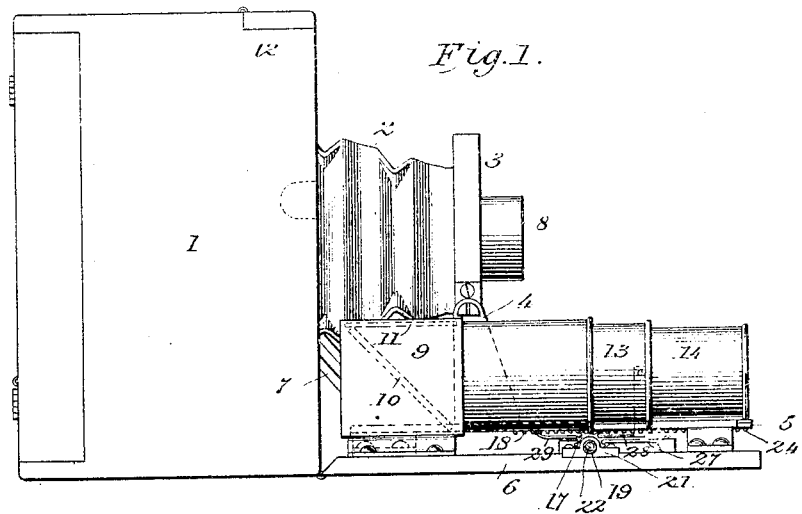

No. 800,081. PATENTED SEPT. 19, 1905.
A. D. DAVIS.
PHOTOGRAPHIC CAMERA.
APPLICATION FILED APR. 18, 1901.

3 SHEETS—SHEET 1.

Witnesses
Inventor

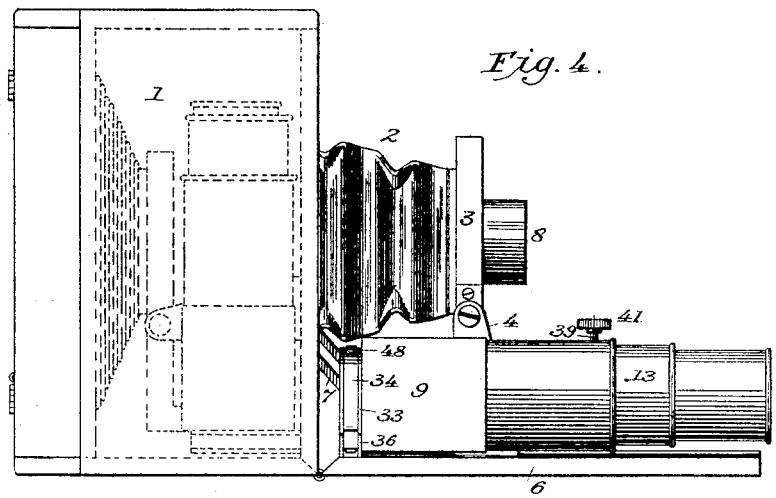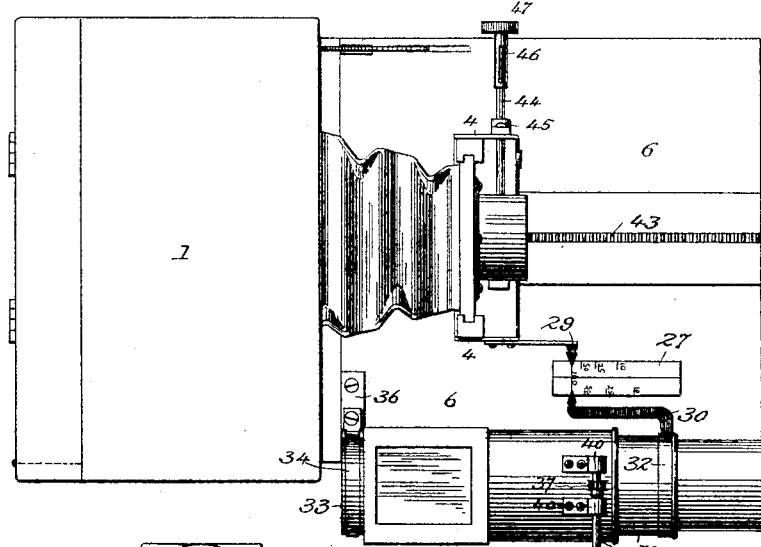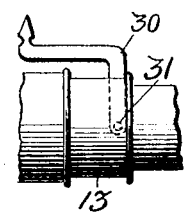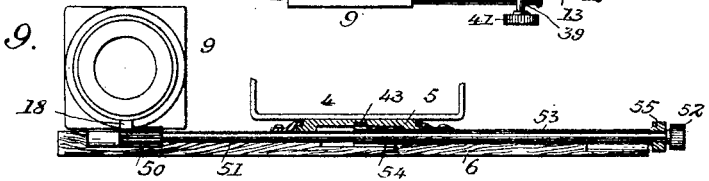

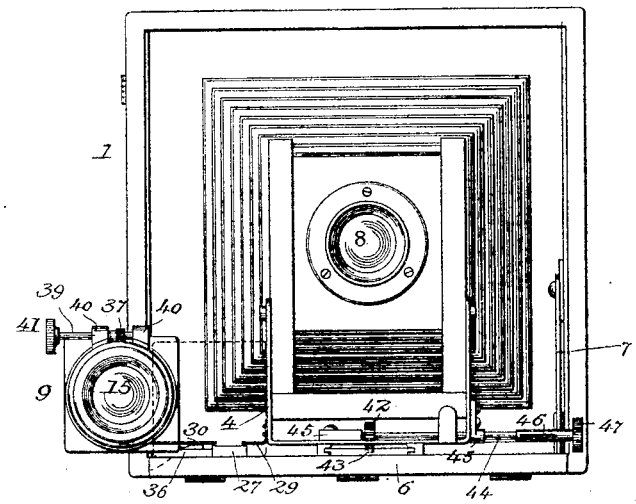
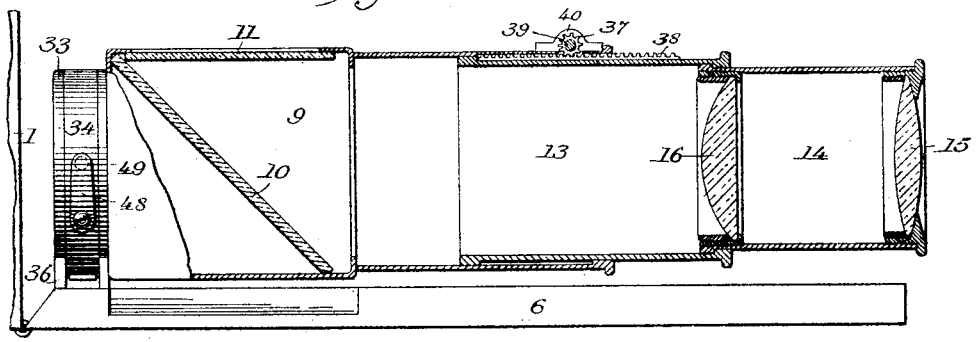
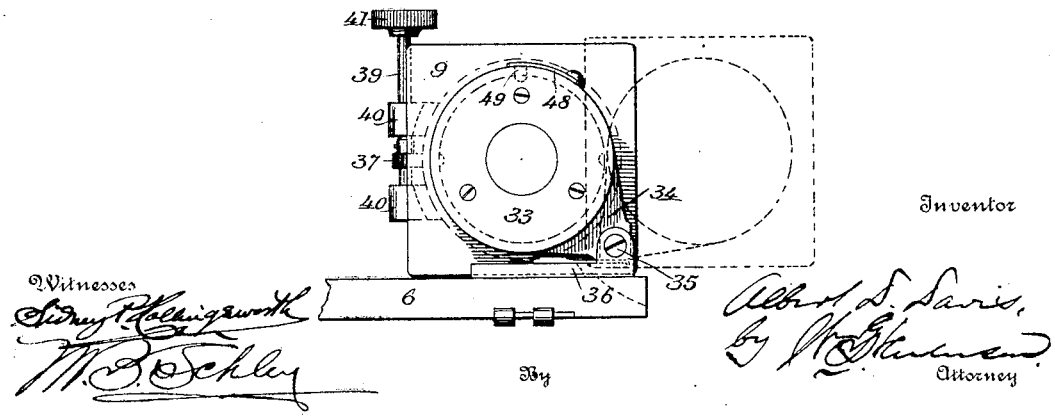

UNITED STATES PATENT OFFICE.

ALBERT D. DAVIS, OF YONKERS, NEW YORK, ASSIGNOR OF ONE-HALF TO FREDERICK W. LIVERMORE, OF NEW YORK, N. Y.

PHOTOGRAPHIC CAMERA.

No. 800,081.  Specification of Letters Patent.  Patented Sept. 19, 1905.

Application filed April 18, 1901. Serial No. 56,460.

*To all whom it may concern:*

Be it known that I, ALBERT D. DAVIS, a citizen of the United States, residing at Yonkers, in the county of Westchester and State of New York, have invented certain new and useful Improvements in Photographic Cameras; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to photographic cameras, and is particularly adapted for such cameras of the folding type; and it has primarily for its object to provide for the adjustment of a projecting lens and a finder-lens relatively to each other and with reference to a graduated scale or index indicating the difference in the focus of the two lenses so that when one lens is adjusted to any given point and the other lens is adjusted to a given point bearing a certain relation to the other point the two lenses will have the same effect as lenses having practically the same focus, notwithstanding the fact that one of the lenses in itself has a different focus from the other lens.

It has also for its object to provide novel and useful features of construction and also of arrangements of parts, adapting the first-mentioned object to be readily attained, and it has further for its object to provide improved features, forming a camera possessing advantages which will appear from the description of the parts hereinafter given, the invention being applicable to cameras already in use, as well as to those which may be constructed in the first instance in accordance with my invention.

Heretofore focusing-finders have been employed in cameras; but in such cases it has been assumed that lenses each having exactly the same focus could be found in sufficient commercial quantities to supply the demand, and hence no provision has been made for overcoming the difficulties experienced when the projecting-lens and the finder-lens in the same cameras are not of exactly the same foci, which difficulties are marked and quite serious in many cases and become more pronounced and varying in degree as the lens is moved beyond a certain point in the operation of focusing. As an illustration of cameras in which these difficulties are experienced mention may be made of twin-lens cameras, commonly referred to in the trade as "double-deckers," and also to other cameras in which a projecting-lens and a finder-lens are employed. There are a very large number of cameras in use that would be more convenient and satisfactory and give more accurate results if a suitable finder could be readily obtained that would independently determine positively the distance of the object to be photographed away from the sensitive plate and that could be attached to a camera with focusing-scales for the projecting-lens and the finder lens, arranged so as to be viewed at one and the same time, and mechanism be employed that would readily bring both lenses to a sharp focus on the composition of the scene or picture to be taken. A twin-lens camera to some extent accomplishes this result, where an expensive lens is employed for projecting the picture on the sensitive plate; but an equally expensive lens of the same prescription must be employed for the finder and both must have the same foci for determining what is the sharp focus of the projecting lens. Even where these expensive lenses are employed they at times fail to give the result desired, as it more frequently happens that no two lenses are made exactly alike, even if the same prescription is followed as closely as the mechanical means employed will admit, and while it may be possible to find two lenses with equal focus and in every way alike, yet the fact remains that they are not obtained in quantities, and thus to obtain two lenses of exactly the same focal length resort must be had to expensive or high-priced types of lenses, which are indispensable to rapid work in the absence of my invention. I therefore seek to overcome these objections by providing an improvement in which the finder can be made cheaply and can be so nearly worked in concert with the lens to be matched that the operator is not embarrassed with the difference existing between the projecting and the finder lenses to such an extent as to retard his rapid work.

The principal cameras of to-day are supplied with focusing mediums for tripod use where the screen takes the place of the sensitive plate, and usually a finder is provided that merely locates the picture with respect to the one to be projected onto the plate, and some of these finders fold in the camera when not in use; but, so far as I am aware, prior to my invention no provision had been made for the adjustment of the projecting-lens and the finder-lens relative to each other in the manner I have heretofore indicated, so that the two lenses will have the same effect as lenses having practically the same foci, notwithstanding that one of the lenses in itself has a different focus from the other lens.

In providing the scale for use with the lenses in the manner I have indicated the first step is to focus the projecting lens at its focal length and at all distances shorter than the same and provide a scale accordingly, then focus the finder to be used (the lens contained in which should be as nearly like the first-mentioned lens as to focal length as possible) at all the different distances and provide a scale for the latter; then locate the respective scales as near the same line of vision as possible. The projecting-lens and the finder-lens both being provided with indexes or pointers to coöperate with their respective scales, the parts are ready for operation, and in order to effect the focusing the finder is adjusted to the point that gives a sharp focus, which point is shown on the scale by the index or finger of the finder, and such point determines the correspondingly-marked point to which the other or projecting-lens should be brought, and when brought to such point it will be found that the effect will be the same as if the two lenses were each of practically the same focus.

Figure 2:
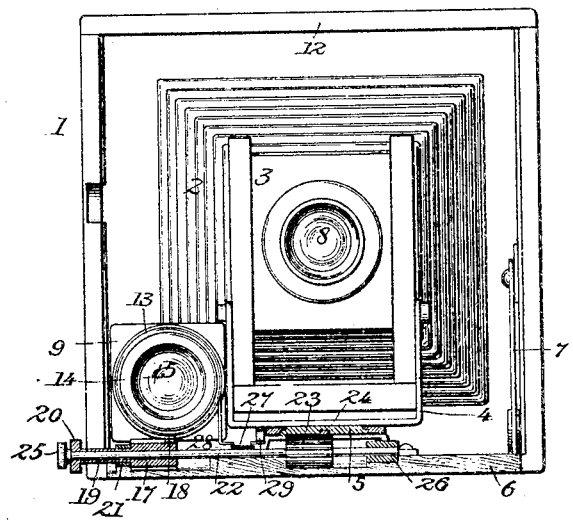
Figure 3:
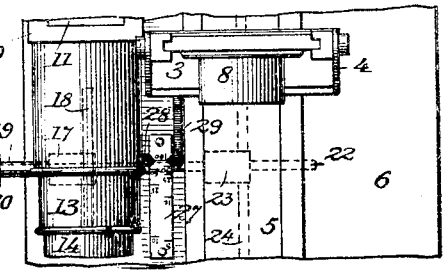

In the drawings, which contain an illustration of my invention, Figure 1 is a side elevation of a folding camera with the front lid or door lowered to operative position with my invention applied thereto. Fig. 2 is a front elevation of the same. Fig. 3 is a plan view of a portion of the camera to illustrate more clearly certain details. Fig. 4 is a side elevation of a camera similar to Fig. 1, but showing certain modifications in which the finder is adapted to be thrown to one side of the side of the camera-box. Fig. 5 is a plan view of Fig. 4. Fig. 6 is a front elevation of the same. Fig. 7 is a longitudinal section, partly in elevation, of a finder that may be used with my invention. Fig. 8 is a rear elevation of the finder. Fig. 9 is a detail view showing a further modification in the means for moving or adjusting the finder and the projecting-lens. Fig. 10 is a detail of a modified means of attaching the index-finger to the finder.

In the drawings, the numeral 1 designates the camera-box; 2, the folding bellows; 3, the projecting-lens frame, which is supported by the slide-bracket 4 upon the guide-plate 5, all of which parts may be of any approved pattern, and 6 designates the hinged lid, which is connected with the camera-box by a brace 7, as usual, and 8 indicates the projecting-lens.

The numeral 9 designates a finder, which in this instance is provided with the mirror 10 and the ground glass 11, as common in many finders. In Figs. 1 to 3 this finder is secured to the lid 6 and is within range of the vision of the operator looking over the top of the camera-box, with the hinged portion 12 of the top thrown back from the position illustrated in Fig. 1. This finder is adapted to be folded inside of the camera-box when the lid is closed, and it is provided with the telescoping sections or tubes 13 and 14, which may be provided with the focusing-lens 15 and a condensing-lens 16, as illustrated in Fig. 7 of the drawings.

In Figs. 1 to 3 the telescoping parts of the finder are moved back and forth by means of a pinion 17 engaging a rack 18 on the lower part of the telescoping section 13, said pinion being at one end of a hollow shaft 19, provided at its other end with a thumb-piece 20, the shaft being journaled in a bearing 21, so that it may slide therein in order that when the lid 6 is to be closed the shaft and pinion may be moved inwardly, so as to permit the same to move inside of the camera-box, the pinion being of elongated form, so that it may remain in engagement with the rack in its inner and outer positions. Through the hollow shaft 19 and the pinion 17 passes another shaft 22, which has a pinion 23, that engages a rack 24, attached to the slide of the bracket 4, so that the projecting-lens and the bellows, to which it is attached, may be moved back and forth, the outer end of the shaft 22 being provided with a thumb-piece 25, by which it may be turned. This shaft is also adapted to be slid in and out, so that when moved inward the parts may fit within the camera-box, the inner end of the shaft 22 being journaled in the bearing 26 and the pinion 23 being of elongated form, so as to keep in engagement with the rack 24 in the outer and inner adjustment of the pinion. By arranging the two shafts as described the thumb-pieces of both shafts are brought close together, so that both may be grasped at the same time by the thumb and forefinger in order to move the finder-lens and the projecting-lens in and out simultaneously and at the same time permit one shaft to be turned independently of the other in the adjustment of the finder-lens and then in the adjustment of the projecting-lens, so as to bring it in proper relation to the finder-lens to give to the two lenses of different foci the effect of two lenses of substantially the same foci, after which the two lenses may be moved simultaneously by grasping at the same time the thumb-pieces of the two shafts. The numeral 27 designates a scale which is graduated according to the differences in focus of the finder-lens and the projecting-lens, with which scale coöperates an index or finger 28 on the finder and an index or finger 29 on the lens-frame or other part movable with the projecting-lens, so that when the finder-lens is adjusted to a certain point, indicated by its finger on the graduated scale, the projecting-lens may be adjusted to a certain position in relation to that point, as indicated by its index or finger being moved to the graduation corresponding with that indicated by the finger of the finder-lens, the graduations being such as before indicated to indicate the differences in the foci of the two lenses. After the two have been adjusted as indicated then they may be moved together, as before specified. If it should happen that the projecting-lens and the finder-lens are of the same focus, then in that event the two lenses may be moved simultaneously by the shafts of the two pinions, and thus it will appear that the construction is such that it may be used where the two lenses are of the same focus or where they are different and it is necessary to adjust one in relation to the other, so as to give the same effect as if the two were of the same focus.

In Figs. 4 to 8 of the drawings I have illustrated another construction embodying the same invention as that already described for the adjustment of the two lenses where they are each of a different focus, a scale 27 being provided, as in the form just described, and an index or finger 29 for the projecting lens and an index or finger 30 for the finder, the index or finger 30 in this form having a pivotal connection with one of the telescoping sections of the finder-lens either by a pivot-pin 31, as shown in Fig. 10, or by a spring-clasp 32, as shown in Fig. 5, which will permit the finger to be turned on the telescoping section so as to permit the finder in its modified form to be folded upon the lid or cover 6, so as to be carried within the camera-box when the lid is closed or to be folded or swung outwardly when the lid is lowered for use of the camera, as indicated in Figs. 4 and 5 of the drawings. In this folding or swinging form of the finder the rear portion 33 of the finder fits within a ring 34, which is hinged by a screw or pin 35 or otherwise to a bracket 36, which is secured to the lid 6 of the camera-box, so that when the lid is lowered the finder may be swung outward to one side of the lid, as indicated in Figs. 5, 6, and 8 of the drawings, thus enabling the operator to take his vision from one side of the camera-box. In this modified form the telescoping section 13 of the finder will be racked back and forth by means of the pinion 37 engaging the rack 38 on the top of the telescoping section, the shaft 39 of said pinion being journaled in the bearings 40 and having the thumb-piece 41, while the projecting-lens will be racked back and forth by the pinion 42 engaging the rack 43, attached to the lid, the shaft 44 of said pinion being journaled in suitable bearings 45 and having a sliding sleeve 46, provided with the thumb-piece 47, so as to rack the lens back and forth, the sliding sleeve permitting the thumb-piece to be moved inward, so that it may lie within the camera-box when the lid is closed. In order to permit the finder to be turned so that either a vertical or horizontal picture may be taken, the rear portion 33 of the finder turns within the ring 34, and for the purpose of holding the finder in position a spring 48 is secured to the ring 34 and has a pin 49, extending through the ring and adapted to engage a depression in the rear part 33 of the finder, so as to hold the finder in its turned position. The operation of this form of the invention in order to adjust the two lenses one in relation to the other, so as to give to the lenses of different focal lengths the same effect as if of practically the same focal length each, is practically the same as under the form first described, and therefore needs no further description.

Instead of providing the projecting-lens and the finder with the pinions and shafts separated from each other, as in Fig. 5, for adjustment of said parts I may employ the construction illustrated in Fig. 9, which is substantially the same as that indicated in Fig. 2 of the drawings, the finder being racked back and forth by the pinion 50 on the end of the shaft 51, which shaft at its outer end is provided with a thumb-piece 52, said shaft passing through the hollow shaft 53, which has a pinion 54 to engage the rack of the slide to the bracket and at its outer end provided with the thumb-piece 55 for manipulating the same. It will thus be observed that these several parts are substantially the same as the corresponding parts illustrated in Fig. 2 of the drawings.

I have illustrated and described with particularity the preferred details of construction and arrangement of the several parts; but it is obvious that such changes can be made therein as will fall within the scope of the appended claims.

Having described my invention and set forth its merits, what I claim is—

1. A camera having a finder mounted thereon and a projecting-lens, each capable of being focused independently, and means whereby the focusing of the finder-lens will indicate the corresponding point to which the projecting-lens should be brought to give to the two lenses the effect of lenses of practically the same focus, substantially as described.

2. A camera having a finder mounted thereon and a projecting-lens, each adapted to be focused independently, a scale indicating the focus of each of the lenses, and means for focusing the lenses, substantially as described.

3. In a camera having a finder and a projecting-lens adapted to be focused independently, a scale indicating the focus of each of the lenses, an index or finger for the finder and the projecting-lens each, and means for adjusting the two lenses to points indicating the same focus, substantially as described.

4. In a camera having a finder and a projecting-lens adapted to be focused independently, a scale indicating the focus of each of the lenses, and means adapted to focus the lenses independently or in unison as desired, substantially as described.

5. In a camera, a finder and a projecting-lens independently adjustable, a scale indicating the focus of each of the lenses, and means provided with manipulating thumb-pieces located contiguous to each other to enable one or both thumb-pieces to be grasped by the thumb and finger to move the lenses independently or in unison as desired, substantially as described.

6. In a camera having a finder and a projecting-lens independently adjustable, a scale indicating the focus of each of the lenses, a hollow shaft and pinion for moving one of the lenses and a shaft passing through the hollow shaft and having a pinion for moving the lens, said shafts adapted to move independently or in unison as desired, substantially as described.

7. In a camera having a finder and a projecting-lens independently adjustable, a scale indicating the focus of each of the lenses, a hollow shaft and pinion for moving one of the lenses and a shaft passing through the hollow shaft and having a pinion for moving the other lens, both of said shafts being slidable and adapted to move independently or in unison, as desired, substantially as described.

In testimony whereof I affix my signature in presence of two witnesses.

ALBERT D. DAVIS.

Witnesses:
    WM. G. HENDERSON,
    GEO. W. REA.